Figure 1:
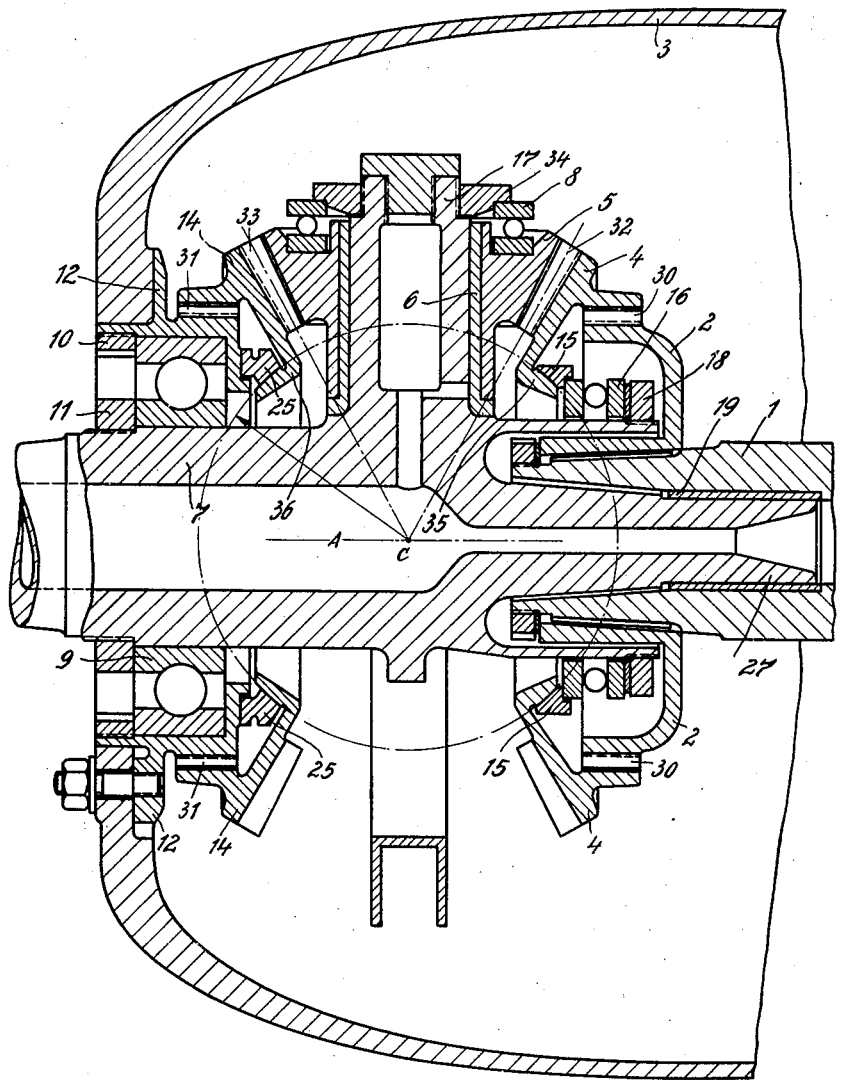

Aug. 27, 1929.  O. A. ZEITHAMMER  1,725,774
BEVEL WHEEL GEAR
Filed Dec. 6, 1928  3 Sheets-Sheet 1

Inventor
O. Anton Zeithammer
by Knight Bros
attorneys

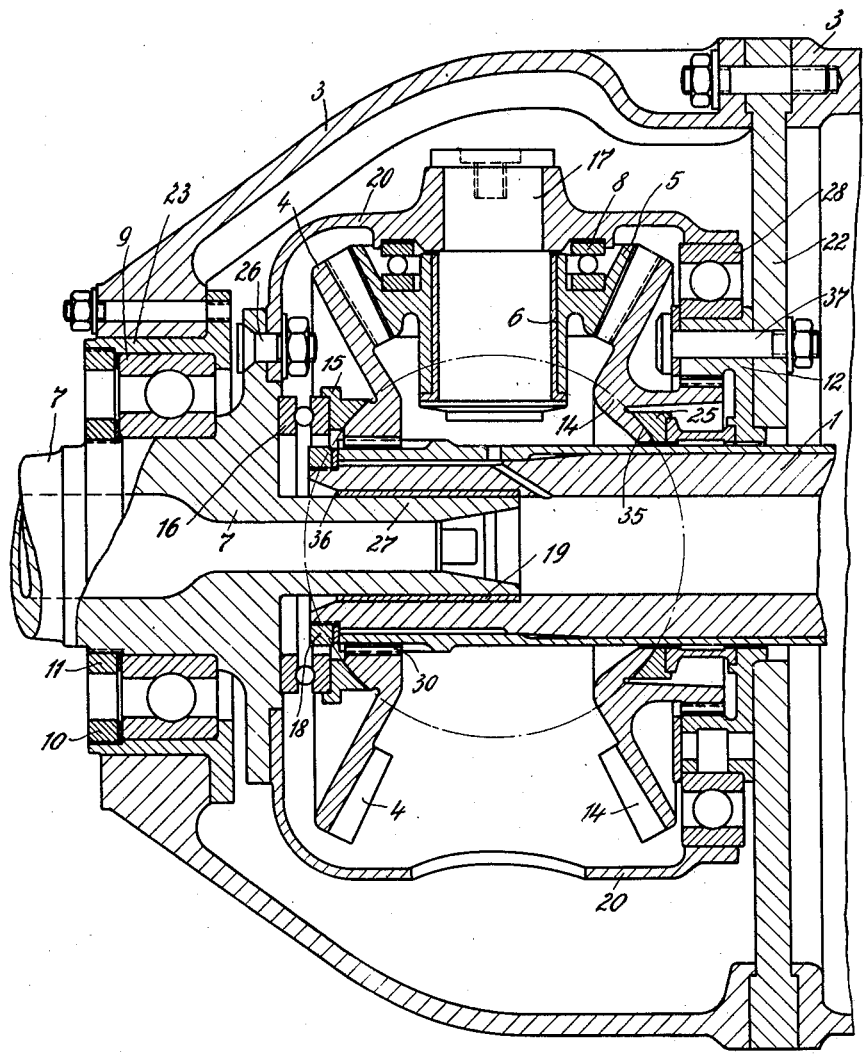

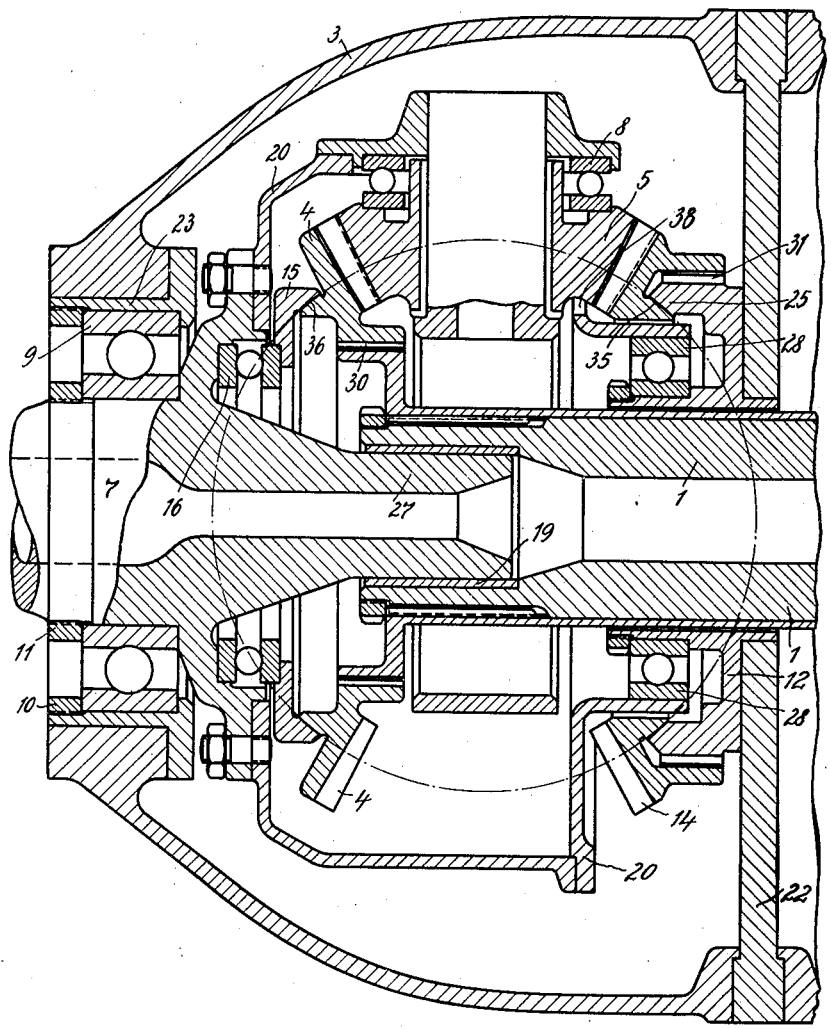

Patented Aug. 27, 1929.

1,725,774

UNITED STATES PATENT OFFICE.

OTTO ANTON ZEITHAMMER, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

BEVEL-WHEEL GEAR.

Application filed December 6, 1928, Serial No. 324,236, and in Germany December 17, 1927.

My invention relates to improvements in bevel-wheel gears for transmitting the rotary motion of a motor to the propeller of an airplane. The gear consists substantially of two main wheels and a plurality of planet wheels located between them. In such gears it is difficult to obtain a uniform contact between the flanks or faces of the teeth of the meshing bevel-wheels. If this uniform contact is not obtained the torque to be transmitted from the crankshaft of the motor or engine to the shaft of the propeller is not uniformly distributed over the individual planet wheels. Excess strains then develop at some places, whereby the faces of the teeth at those places become bady worn and the teeth are liable to break off. This danger arises in airplane engines particularly for the reason that with a view of reducing the weight as far as possible the teeth of the gear wheels must be subjected to strains up to the permissible limit.

The object of my invention is to eliminate impermissibly great strains on the teeth due to the iregular transmission of the torque by supporting the main wheels of the bevel gear flexibly in such a manner, that they are able to set themselves in the position most suitable for transmitting the torque without the accuracy of the engagement of the teeth being interfered with. This accurate adjustment of the main wheels is obtained by providing them with supporting faces which form part of a sphere the center of which coincides with the point of intersection of the apexes of the gear cones of the bevel wheels.

In the drawings affixed hereto and forming part of my specification two embodiments of my invention are illustrated by way of example.

In the drawings—

Fig. 1, shows a design in which the planet or mitre wheels are journaled on pins integral with the propeller shaft, Fig. 2, illustrates an arrangement in which the planet wheels are journaled on pins connected with the propeller shaft by a kind of housing. This housing is also specially journaled at the side opposite the place of attachment, and Fig. 3, a similar arrangement to Fig. 2, the difference being that the bearing closely surrounds the crankshaft and consequently has a small diameter, while in Fig. 2 the bearing has a comparatively large diameter.

Like parts are indicated by like numerals of reference in the various figures of the drawings.

Referring to Fig. 1 of the drawing, 1 is the crankshaft of the motor or engine to which is keyed a dished disc 2 provided on its outer circumference with teeth 30. A second disc 12 likewise provided with teeth on its outer circumference is bolted to the housing 3, which encloses the entire gearing. 4 and 14 are the two main wheels with bevel or mitre teeth 32, 33. These main wheels engage with internal teeth respectively the circumferential teeth of the discs 2 and 12 in the manner of a claw coupling and are in this way flexibly coupled with these discs.

Between the main wheels 4 and 14 are meshed the planet wheels 5, for instance three set at an angle of 120° of which one only is shown in the drawings. Each planet wheel or pinion of the epicyclic gear is journaled upon a pin or trunnion 17 by means of the bushing 6 and is supported by a thrust ball-bearing 8 against the collar 34 threaded onto pin 17 to hold the pin axially in place. The pins 17 are made in this case integral with the propeller shaft 7. This propeller shaft is journaled in a ball-bearing 9 accommodated in the interior of the disc 12 and secured in position by rings 10 and 11. A further support of the propeller shaft is obtained at its rear end 27 which penetrates into the crankshaft 1 and is journaled there in a sleeve-type bearing 19.

The main bevel wheels 4 and 14 are furthermore provided respectively with supporting spherical abutment faces 35 and 36, which contact with correspondingly designed counter-faces provided respectively upon rings 15 and 25. Ring 15 abuts against a ball-bearing 16, which at the other side is held in position by a nut 18 disposed on a threaded extension of the propeller shaft, while the other ring 25 abuts against the inner face of the toothed ring 12 and is thus prevented from giving way. The center of the spherical supporting faces coincides with the points or apexes of the gear cones in a point C on the axis A.

The gear functions in the following manner: The crankshaft 1 drives the main wheel 4 through disc 2. In this way the planet wheels are set in rotation, roll upon the main wheel 14 held stationary and carry the propeller shaft around which assuming main wheels of equal size rotates at half the speed of the crankshaft.

If the individual planet wheels make irregular contact with the main wheel 14, this wheel gives way where the pressure is greatest, so that the pressure is able to distribute itself uniformly over the three planet wheels. The main wheel 14 thereby slides upon the spherical abutment ring 25. It is, however, bound to move always in such a manner, that the apex of its gear cone maintains its original position. This also holds good for the wheel 4. It has been ascertained that by this arrangement a smooth run of the wheels is attained with little wear and consequently an extremely long life of the gearing.

Referring to the embodiment of my invention illustrated in Fig. 2 of the drawings, it will be observed, that the planet wheels are mounted in the housing 20, which is connected to the propeller shaft 7 by a number of bolts 26. This housing is at the opposite end facing the motor, supported upon the ring 12 by the aid of a ball-bearing 28. The supporting ring 12 is mounted by means of bolts 37 on a wall 22 forming part of the housing 3 enclosing the gear. In this design the position of the two main wheels 4 and 14 has been interchanged, i. e. the wheel 4 entrained by the crankshaft is mounted on the end facing the propeller, while the stationary wheel 14 is arranged at the motor side. The wheel 4 flexibly engages with its interior teeth 30 teeth milled directly into the crankshaft, so that a special intermediate disc 2, as shown in Fig. 1, is dispensed with. In this case the drive takes place from the crankshaft 1 across the main wheel 4 coupled with it and the planet wheels 5 to the housing 20 connected with the propeller shaft by bolts 26.

Oscillations of the propeller shaft or crankshaft are in this arrangement efficiently kept away from the wheels, since the housing 20 is journaled in the ball-bearing 28 and the propeller shaft connected with it is journaled in the ball-bearing 9 and with its extension 27 in the interior of the crankshaft at 19.

The arrangement according to Fig. 3 of the drawings differs from that in Fig. 2 substantially only in so far as the bearing 28 for the housing 20 closely surrounds the crankshaft 1, so that this bearing has a small diameter only and is therefore lighter and cheaper. The planet wheels 5 protrude in this arrangement through recesses 38 and thus are able to mesh with the main wheel 14 located at the outside, and coupled at 31 with plate 12, bolted to wall 22 as was explained with reference to Fig. 2.

Various modifications and changes may be made without departing from the spirit and the scope of the invention, and I desire, therefore, that only such limitations shall be placed thereon as are imposed by the prior art.

I claim as my invention:—

1. In a bevel-wheel gear drive for transmitting the rotary motion of a motor to a propeller shaft, a gear housing containing a motor shaft, a main bevel wheel flexibly coupled with said motor shaft, a propeller shaft, a second main bevel wheel flexibly coupled with the gear housing, planet wheels meshed between said main wheels, bearings for said planet wheels mounted on said propeller shaft, spherical supporting faces on said main gear wheels the center of which coincides with the apex of the gear cone of the bevel wheels, and spherical abutment faces for said spherical supporting faces.

2. In a bevel-wheel gear drive for transmitting the rotary motion of a motor to a propeller shaft, a gear housing containing a motor shaft, a main bevel wheel flexibly coupled with said motor shaft, a propeller coupled with the gear housing, planet wheels shaft, a second main bevel wheel flexibly meshed between said main wheels, bearings for said planet wheels mounted on said propeller shaft, means for journalling said planet wheels in axial direction at a certain distance from the axis of said propeller shaft, spherical supporting faces on said main gear wheels the center of which coincides with the apex of the gear cone of the bevel wheels, and spherical abutment faces for said spherical supporting faces.

3. In a bevel-wheel gear drive for transmitting the rotary motion of a motor to a propeller shaft, a main gear housing containing a motor shaft, a main bevel wheel flexibly coupled with said motor shaft, a propeller shaft, a second main bevel wheel flexibly coupled with said main gear housing, planet wheels meshed between said main bevel wheels, a casing for said planet wheels having radially inwardly directed bosses serving as bearings for said planet wheels, said casing being fixed at one side to said propeller shaft and being rotatably supported at the other side on said main gear housing, spherical supporting faces on said main bevel wheels the center of which coincides with the apex of the gear cone of the bevel wheels, and spherical abutment faces for said spherical supporting faces.

4. In a bevel-wheel gear drive for transmitting the rotary motion of a motor to a propeller shaft, a main gear housing containing a motor shaft, a main bevel wheel flexibly coupled with said motor shaft, a propeller shaft, a second main bevel wheel flexibly coupled with said main gear housing, planet wheels meshed between said main bevel wheels, a casing for said planet wheels having radially inwardly directed bosses serving as bearings for said planet wheels, said casing being fixed at one side to said propeller shaft and journalled at the other side in a bearing closely surrounding said crank shaft, spherical supporting faces on said main wheels the center of which coincides with the apex of the gear cone of the bevel wheels, and spherical abutment faces for said spherical supporting faces.

In testimony whereof I affix my signature.

O. ANTON ZEITHAMMER.